United States Patent
Lehureau et al.

(10) Patent No.: US 8,749,794 B2
(45) Date of Patent: Jun. 10, 2014

(54) OPTICAL DEVICE FOR MEASURING ANEMOMETER PARAMETERS

(75) Inventors: Jean-Claude Lehureau, Sainte Genevieve des Bois (FR); Gabrielle Lehureau, legal representative, Sainte Genevieve des Bois (FR); Patrick Feneyrou, Igny (FR); Jean-Pierre Schlotterbeck, Rochefort-Samson (FR)

(73) Assignee: Thales, Neuilly sur Seine (FR)

( * ) Notice: Subject to any disclaimer, the term of this patent is extended or adjusted under 35 U.S.C. 154(b) by 1076 days.

(21) Appl. No.: 12/738,556

(22) PCT Filed: Oct. 15, 2008
(Under 37 CFR 1.47)

(86) PCT No.: PCT/EP2008/063838
§ 371 (c)(1),
(2), (4) Date: Mar. 2, 2011

(87) PCT Pub. No.: WO2009/050180
PCT Pub. Date: Apr. 23, 2009

(65) Prior Publication Data
US 2012/0140237 A1    Jun. 7, 2012

(30) Foreign Application Priority Data
Oct. 16, 2007    (FR) .................................... 07 07243

(51) Int. Cl.
| | |
|---|---|
| *G01B 9/02* | (2006.01) |
| *G01K 11/00* | (2006.01) |
| *G01S 17/95* | (2006.01) |
| *G01S 17/58* | (2006.01) |
| *G01P 5/26* | (2006.01) |

(52) U.S. Cl.
CPC ................. *G01S 17/95* (2013.01); *G01S 17/58* (2013.01); *G01P 5/26* (2013.01)
USPC ........................................... 356/477; 374/162

(58) Field of Classification Search
USPC .................. 356/28.5, 450, 477, 512, 340, 342
See application file for complete search history.

(56) References Cited

U.S. PATENT DOCUMENTS 3,472,598 A * 10/1969 Hossmann ..................... 356/517
3,834,816 A    9/1974 Pedinoff
(Continued)

OTHER PUBLICATIONS

J.N. Forkey, et al., "Accuracy Limits for Planar Measurements of Flow Field Velocity, Temperature and Pressure Using Filtered Rayleigh Scattering", Experiments in Fluid, Feb. 1, 1998, pp. 151-162, vol. 24, No. 2, Springer-Verlag, Heidelberg, DE, XP000777622.

(Continued)

*Primary Examiner* — Gregory J Toatley, Jr.
*Assistant Examiner* — Willie Merrell, II
(74) *Attorney, Agent, or Firm* — Baker & Hostetler LLP

(57) ABSTRACT

The general field of the invention is that of optical devices designed for measuring anemometer parameters such as speed and temperature, the device being mounted on an aircraft and comprising an optical emission module illuminating the outside air, an optical reception module capable of receiving the light scattered by the air molecules, optical means forming a reference path and computing means connected to the reception module. The optical reception module comprises optical mixing means for mixing a portion of the beam originating from the reference path and a portion of the scattered light beam. The optical emission and reception means are arranged so that the reception device collects the light originating from the Brillouin-Mandel'shtam scattering.

18 Claims, 10 Drawing Sheets

(56) References Cited

U.S. PATENT DOCUMENTS

| | | | | |
|---|---|---|---|---|
| 4,026,655 | A | * | 5/1977 | Gunter, Jr. .................. 356/28 |
| 4,537,647 | A | * | 8/1985 | Foster ........................ 156/245 |
| 4,988,190 | A | * | 1/1991 | Miles .......................... 356/28 |
| 5,110,217 | A | * | 5/1992 | Sweeney ..................... 374/123 |
| 5,317,376 | A | | 5/1994 | Amzajerdian et al. |
| 5,825,465 | A | * | 10/1998 | Nerin et al. ................. 356/28.5 |
| 6,369,375 | B1 | * | 4/2002 | Ishiwata ..................... 250/208.1 |
| 6,646,591 | B2 | * | 11/2003 | Aker et al. .................. 342/114 |
| 6,847,437 | B2 | * | 1/2005 | Bruel et al. ................. 356/28.5 |
| 7,352,447 | B2 | | 4/2008 | Schlotterbeck et al. |
| 7,352,476 | B2 | | 4/2008 | Baillon et al. |
| 7,423,736 | B2 | | 9/2008 | Baillon et al. |
| 7,495,822 | B2 | | 2/2009 | Baillon et al. |
| 7,580,132 | B2 | | 8/2009 | Baillon et al. |
| 7,581,441 | B2 | | 9/2009 | Barny et al. |
| 7,616,294 | B2 | | 11/2009 | Lacondemine et al. |
| 2004/0027570 | A1 | | 2/2004 | Caldwell et al. |
| 2005/0083534 | A1 | * | 4/2005 | Riza et al. ................... 356/477 |
| 2006/0245468 | A1 | * | 11/2006 | Hartog ........................ 374/161 |
| 2007/0159683 | A1 | | 7/2007 | Baillon et al. |
| 2007/0165225 | A1 | * | 7/2007 | Trainer ....................... 356/335 |
| 2010/0134780 | A1 | | 6/2010 | Rodeau et al. |

OTHER PUBLICATIONS

Benjamin Chu, "Laser Light Scattering", Annual Review of Physical Chemistry, Oct. 1970, pp. 145-174, XP002488621.

* cited by examiner

OPTICAL DEVICE FOR MEASURING ANEMOMETER PARAMETERS

CROSS-REFERENCE TO RELATED APPLICATIONS

This application is a National Stage of International patent application PCT/EP2008/063838, filed on Oct. 15, 2008, which claims priority to foreign French patent application No. FR 07 07243, filed on Oct. 16, 2007, the disclosures of which are hereby incorporated by reference in their entirety.

FIELD OF THE INVENTION

The field of the invention is that of optical devices for measuring anemometer parameters required for piloting aircraft and more particularly civil transport airplanes.

BACKGROUND OF THE INVENTION

An airplane must have the following parameters for the flight controls:
the air speed indicated in two or three directions;
the speed of sound or the air temperature;
the static pressure.

The indicated air speed is conventionally measured by the pressure difference observed between two precise points of a Pitot tube making it possible to maximize the aerodynamic pressure effect. It must be measured with an accuracy of the order of 15 cm/s.

The speed of sound is deduced from a temperature measurement called "total temperature" made at a point of aerodynamic compression of the atmosphere, usually at the nose of the aircraft. This speed is considerable in the field of transonic speeds. The accuracy of measurement is of the order of 1 m/s corresponding to a temperature difference of 2K.

The static pressure is measured at a point on the surface of the aircraft which is not very sensitive to aerodynamic differences. Its accuracy of measurement is approximately 20 Pa.

The indicated air speed is a combination of the real speed and the density of the air. It may therefore be measured based on a true air speed datum and on a measurement of the density of the atmosphere.

Currently, the probes necessary for measuring these parameters are extrusions to the structure of the cabin. They have many drawbacks. They are fragile, are sensitive to frost and require considerable defrosting means. They also generate additional drag.

It is possible to replace these probes with laser velocimeters which have the advantage of not being intrusive. The operating principle of a velocimetric probe is as follows. At a certain distance from the skin of the airplane, a network of interference fringes is created. When an atmospheric aerosol passes through this network, a modulated signal is sent back to the probe. Measuring the characteristics of the signal makes it possible to find the speed information that is sought. Nevertheless, this solution has certain drawbacks. It is not possible to measure the temperature by this means. Moreover, in the absence of aerosols, the measurement is no longer possible.

SUMMARY OF THE INVENTION

The device according to the invention makes it possible to measure the speed of sound, and therefore the temperature and the true air speed so as to supplement or complete the information from the laser velocimeter in the absence of aerosols.

More precisely, the subject of the invention is an optical device designed to measure anemometer parameters of a gas in movement such as its speed and its temperature, said gas occupying a determined measurement zone, the device comprising an optical emission module, an optical reception module, optical means forming a reference path and computing means connected to the reception module,
the optical emission module comprising a first optical system emitting a first beam of light at a first wavelength in the determined zone, said first optical system having a first optical axis,
the optical reception module comprising a second optical system and at least a first photoreceptor, said second optical system:
having a second optical axis,
comprising at least optical mixing means for mixing a portion of the first emission beam originating from the reference path and a second light beam corresponding to a portion of the light of the first beam scattered by the determined zone, said second beam being emitted at least a second wavelength,
forming the image of the first and second mixed beams on said photoreceptor,
the computing means being arranged so as to determine at least the difference in wavelength or in frequency between the first wavelength and the second wavelength,
characterized in that the spatial period, defined as the ratio of the first wavelength over twice the sine of the angle that the first and the second optical axis make between them, is greater than or equal to the measured mean free path of the gas molecules in movement.

Advantageously, the angle that the first and the second optical axis make between them is different from zero and is of the order of a few degrees.

Advantageously, the optical means of the reference path comprise an optical fiber and optical elements arranged so as to inject into said fiber a portion of the first light beam.

Advantageously, the second optical system comprises at least optical mixing means for mixing a portion of the first emission beam originating from the reference path and a third light beam corresponding to a portion of the light of the first beam scattered by the determined zone, said third beam being emitted at least a second wavelength.

Advantageously, the optical reception module comprises a second photoreceptor, said second optical system forming the image of the first and third mixed beams on said second photoreceptor.

Advantageously, an optical phase strip is placed on the path of the third beam upstream of the optical mixing means.

Advantageously, the optical mixing means are a strip, with flat and parallel faces, inclined on the optical axes of at least the first light beam and of at least the second light beam, the first light beam being transmitted by said strip after two successive reflections, the second light beam being transmitted directly by said strip. They may also be a diffraction grating, at least one of the beams being diffracted by said grating, or may be a Nomarski prism.

Advantageously, the optical mixing means comprise a phase strip arranged so as to divert the first, second and third beams in three different directions thus creating three triplets of three beams, each triplet of diverted beams having a phase shift relative to the other two. The phase strip may comprise a periodic structure comprising identical elements, each element comprising at least three flat inclined facets.

Advantageously, the computing means comprise Fourier transform computing means for the signals originating from the photoreceptors, means for analyzing said Fourier transforms so as to determine the frequency peak or peaks, the anemometer parameters being determined based on the analysis of the position of said peaks. Moreover, when the optical reception module comprises two receptors, the computing means perform the Fourier transform on a complex pseudo-signal the real portion of which is the first signal originating from the first photoreceptor and the imaginary portion the second signal originating from the second photoreceptor.

The invention also relates to the carrier of the aforementioned device, in this case, the measurement zone being situated in the vicinity of and outside the limit boundary of the aircraft.

Advantageously, the device is of the parietal type, that is to say that all of the elements of the device are placed inside the craft, only the first light beam being emitted to the outside of the aircraft. It may comprise a reflecting optical element placed on the skin of the aircraft and arranged so as to reflect to a portion of the light of the first beam scattered by the determined zone on the optical axis of the second optical system thus forming the second beam. It may also comprise a mechanical element arranged so as to create acoustic turbulence in the vicinity of the measurement zone.

BRIEF DESCRIPTION OF THE DRAWINGS

The invention will be better understood and other advantages will appear on reading the following description given as nonlimiting and by virtue of the appended figures amongst which.

DETAILED DESCRIPTION

Laser velocimeters usually operate on the aerosols. This solution is currently the only nonintrusive solution providing the desired accuracy of speed. On the other hand, there is no nonintrusive solution on the market for the measurement of temperature. The optical devices according to the invention make it possible to measure the speed of sound and therefore the temperature and the true air speed in order to replace or supplement the information from a laser velocimeter in the absence of aerosols.

The physical principle of measuring the air temperature can be deduced from molecular Rayleigh scattering. By using this mechanism, the spectral distribution of scattered light is associated with the molecular movement in the gas.

Figure 1:
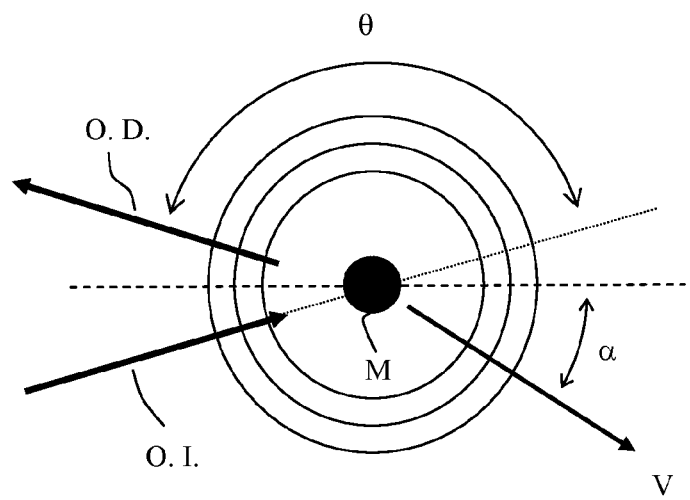
FIG. 1 represents the principle of Rayleigh scattering.

In a simplified model of molecular Rayleigh scattering, each molecule is the source of a spherical wave as indicated in FIG. 1 the Doppler shift of which depends on the direction of collection and on the speed of the molecules M. This then gives:

$$\lambda_s = \lambda \frac{1 - v\cos(\alpha)\sin\left(\frac{\theta}{2}\right)/c}{1 + v\cos(\alpha)\sin\left(\frac{\theta}{2}\right)/c} \approx \frac{\lambda}{1 + 2\frac{v\cos(\alpha)\sin\left(\frac{\theta}{2}\right)}{c}} \quad \text{Equation 1}$$

where $\lambda$ is the wavelength of the incident wave O.I.;

$\lambda_s$ is the wavelength of the scattered wave O.D. scattered by the molecules;

c is the speed of light and V the speed of the molecules;

$\theta$ is the angle between the wave vectors of the incident wave and of the scattered wave, the wave vectors being defined in the same reference mark;

$\alpha$ is the angle between the speed vector V and the wave vector of the incident wave.

Figure 3:
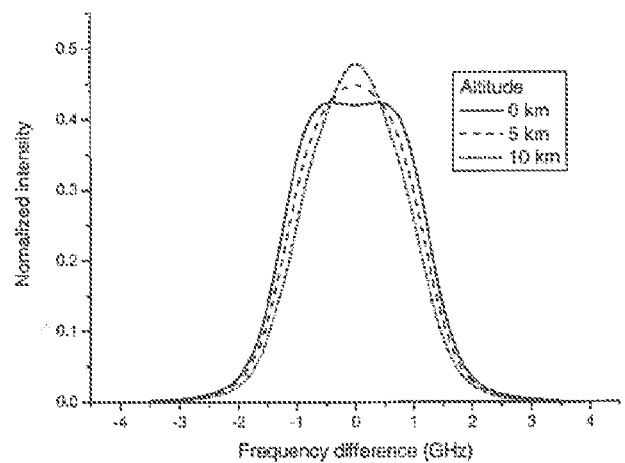
FIG. 3 represents the spectral scattering of light in the case of the Rayleigh scattering model.

The Gaussian distribution of the molecular speeds induces a Gaussian widening of the spectral distribution of the scattering as indicated in FIG. 3 which represents the distribution of intensity of the scattered light by a purely monochromatic wave as a function of the variation of optical frequency around the frequency of the incident wave. In FIG. 3, the distribution of intensity is given for three given molecular concentrations of nitrogen corresponding to three different altitudes (on the ground, at altitudes of 5 km and 10 km), for an incident wavelength of 355 nm and for a collection angle of π rad.

Figure 2:
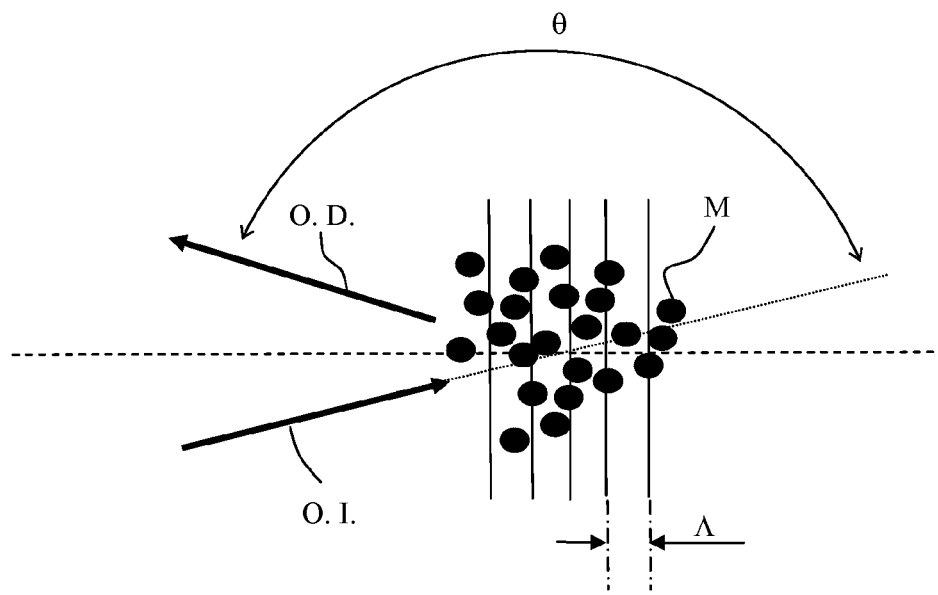
FIG. 2 represents the principle of Brillouin-Mandel'shtam scattering.

In a more precise model illustrated in FIG. 2, the diffraction of the incident wave to the collection system is linked to the fluctuations of molecular density along a volume grating having the correct direction and the spatial period $\Lambda$. This gives the relation:

$$\Lambda = \frac{\lambda}{2 \cdot \sin\left(\frac{\theta}{2}\right)} \quad \text{with the same notations above.}$$

In a model with no collision between the molecules, the time to reconfigure this grating is linked to $\Lambda$ and to the speed of each molecule. It induces a Gaussian widening of the scattered wave which is similar to the widening described in the context of the previous simplified model. In order to introduce the contribution of the molecular collisions, the pitch of the grating must be compared with the molecular mean free path in order to describe the spectral distribution of the molecular scattering. In physics and in kinetic theory of gases, the mean free path of a particle is the mean distance that a particle travels between two collisions. The ratio between $\Lambda$ and the mean free path $l_m$ is marked y in the rest of the description.

If the mean free path of the molecules is greater than the pitch of the interferences, or y<1, the spectral distribution is determined by the Brownian motion of the molecules. This situation, called the kinetic theory, is usually encountered when the molecular density is low or when the backscattered light is collected for a short wavelength, for example when the wavelength λ is situated in the U.V. field. The spectrum of the molecular backscatter is thermally widened, which leads to a Gaussian distribution the width of which is proportional to the square root of the temperature.

Figure 4:
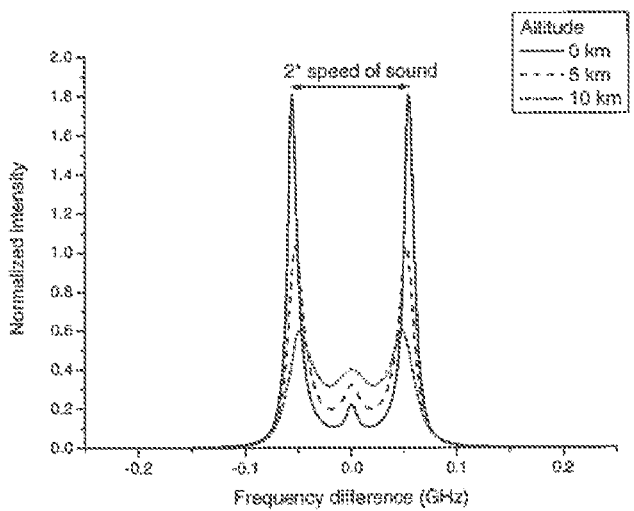
FIG. 4 represents the spectral scattering of light in the case of the Brillouin-Mandel'shtam scattering.

Conversely, if the mean free path is comparable to or less than the pitch of the interferences, or y>1, the evolution of the molecular density along the volume grating is dictated by the scattering equation and can be slower than the speed of the molecules. This slowing leads to a refinement of the diffracted spectrum. This theory is called the hydrodynamic theory. The spectrum then has three rays as illustrated in FIG. 4 which represents the distribution of intensity of the scattered light by a purely monochromatic wave as a function of the variation of optical frequency around the frequency of the incident wave. In FIG. 4, the distribution of intensity is given for three given molecular concentrations of nitrogen corresponding to three different altitudes (on the ground, and at altitudes of 5 km and 10 km), for an incident wavelength of 1550 nm and for a collection angle of 500 mrad. The central ray corresponds to the molecular scattering and the two rays on either side, called Brillouin-Mandel'shtam scattering, are linked to the thermal activation of the acoustic waves. The spectral shift between the central ray and the two acoustic rays makes it possible, by knowing the pitch of the grating Λ, to measure the speed of sound $v_s$ and hence the temperature.

In the case of an aircraft in flight, it is clear that the mean free path cannot be known precisely at each moment. However, it is possible, knowing the maximum altitude of the aircraft, to know its maximum value approximately. In this case, for the condition y>1 to be still verified, it is sufficient that the spatial period Λ is markedly greater than this maximum value of the mean free path.

Irrespective of the operating theory, hydrodynamic theory or kinetic theory, the central frequency of the Rayleigh scattering sustains a shift due to the speed of the airplane relative to the air. It is therefore possible to measure the air speed by using a frequency reference. It is possible, for example, to use a mixture of the scattered wave with a local oscillator in a coherent detection diagram or a calibration of an interferometer in a noncoherent detection diagram. Such a speed measurement can be used as a support for an anemometer based on the backscattering by the aerosols in the event of insufficient concentration of the latter.

As shown in FIG. 4, the bigger the parameter y, the spectrally narrower the Brillouin-Mandel'shtam scattering. The value of y being proportional to the wavelength Λ of the diffracting grating, it is preferable to use an infrared incident wave and/or a small collection angle. Moreover, the larger Λ, the smaller the shift of the acoustic rays Δf, equal to the ratio $v_s/Λ$.

In the case of a monostatic optical architecture, that is to say an architecture operating in backscattering, the angle θ equals π and the value of Λ is strictly equal to half the wavelength of the incident wave. In this case, it is necessary to use a big wavelength so as to increase the parameter y. However, the scattered power decreases rapidly when the wavelength increases. This power is weak and it is worthwhile to optimize it.

Also, the optical device according to the invention comprises a bistatic geometry in which the angle θ is small, hence making it possible to maximize the thinness of the acoustic rays, which makes detection easier in a coherent architecture while leaving the choice of a short wavelength to increase the scattered power.

Figure 5:
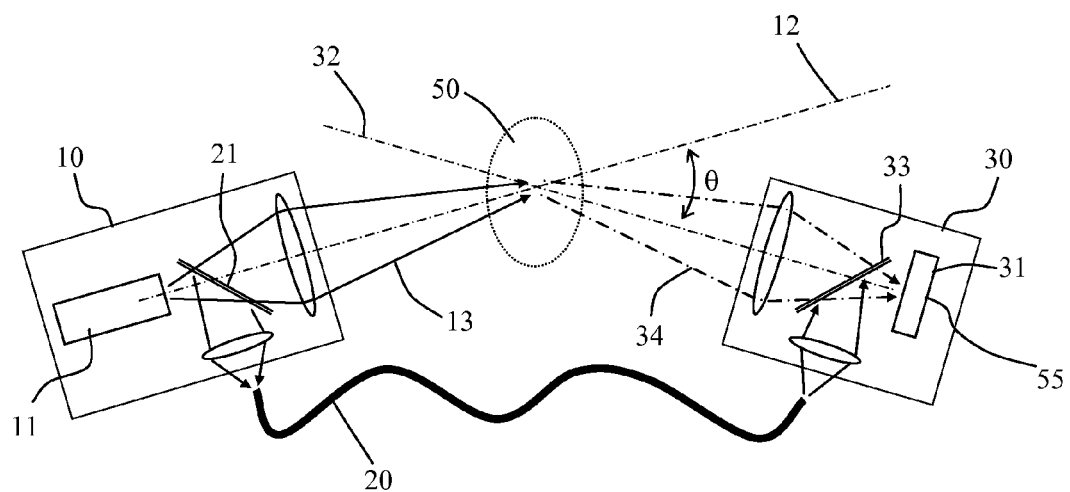
FIG. 5 represents a first diagram embodying the optical device according to the invention.

More precisely, and as a first example, FIG. 5 represents a first diagram of the embodiment of the optical device according to the invention. In this and the following figures, the computing means are not shown. The optoelectronic portion of the device comprises:

an optical emission module 10 comprising a first optical system comprising a coherent light source 11 emitting a first beam of light 13 at a first wavelength in a determined measurement zone 50 represented by a dotted-line oval in FIG. 5, said first optical system having a first optical axis 12, optical means forming a reference path 20. In the case of FIG. 4, the reference path consists of an optical fiber and of separating optical strips 21 arranged so as to inject into said fiber a portion of the first beam of light;

an optical reception module 30 comprising a second optical system and at least a first photoreceptor 31, said second optical system:

having a second optical axis 32, comprising at least optical mixing means 33 for mixing a portion of the first emission beam 13 originating from the reference path and a second light beam 34 corresponding to a portion of the light of the first beam scattered by the measurement zone, said second beam being emitted at least a second wavelength, forming an image 55 of the first and second mixed beams on the first photoreceptor 31, the angle θ that the first and the second optical axis make between them is of the order of a few degrees.

Figure 6:
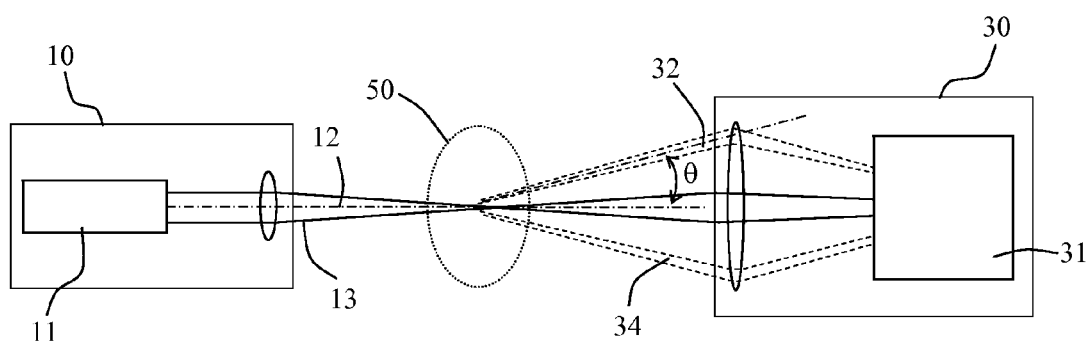
FIG. 6 represents a second diagram embodying the optical device according to the invention.

In a variant of the device of FIG. 5 shown in FIG. 6, the reference beam is not led to the detector via an auxiliary path, fibered or not, but it is the nondiffracted portion of the first beam that forms the reference path for coherently detecting the diffracted orders collected by the optical reception module. The advantage of this solution is that it eliminates the spurious signals introduced by the fluctuations of one or other of the paths.

As has been said, the scattered beam has at least one wavelength $λ_s$ that is different from the wavelength λ of the initial beam. As can be seen in equation 1, the difference in wavelength is proportional to the ratio v/c, v representing the speed of the molecules which is of the order of a few hundreds of meters/second and c representing the speed of light which is $3·10^8$ meters/second. Consequently, this difference is very small. The spectrum of the scattered wave could be analyzed by conventional means such as diffracting gratings, Michelson or Fabry-Perot interferometers. However, the fineness of analysis required is incompatible with a low-cost system.

Also, it is preferable to mix the scattered beam with a portion of the first beam. Specifically, in this case, it is possible to demonstrate that the combination of the two beams is modulated at a frequency equal to the difference in the frequencies of the two optical beams. Because the wavelength of the initial beam is an optical wavelength with a frequency of the order of a few hundred terahertz and the difference in wavelength or in frequency is of the order of $10^{-6}$, the frequency of modulation is a few hundred megahertz and is perfectly measurable with a great precision. It is therefore essential that the device comprises a reference path.

The simplest way of measuring this modulation frequency is to perform a Fourier transform of the signal modulated by the mixture of the two beams and sent to a photoreceptor.

Figure 7:
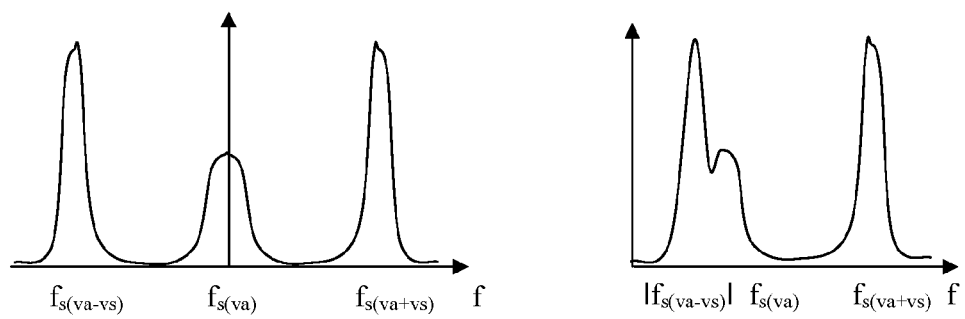
FIG. 7 represents two views of the Fourier transform of the signal originating from the photoreceptor.

More precisely, and as illustrated in FIG. 7, the modulated spectrum comprises three modulation frequencies corresponding to the spectrum of the scattered light, one central frequency $f_{s(va)}$ corresponding to the scattering of the light by a beam sweeping the outside air at the speed $v_a$ of the aircraft and two lateral frequencies $f_{s(va-vs)}$ and $f_{s(va+vs)}$ corresponding to the scattering of the light by the molecular agitation motion at the speed $v_s$. These three frequencies are respectively proportional to the speeds $v_a$, $v_a-v_s$ and $v_a+v_s$. When the scattered beam is mixed with the reference beam, usually the speed $v_a$ of the aircraft is less than the mean speed $v_s$ of the molecular agitation. Consequently, the frequency spectrum sustains a folding around the central frequency as indicated in FIG. 8.

It is still possible to analyze this folded spectrum. It is however possible to use various solutions to prevent the spectrum from folding.

A first solution consists in artificially shifting the central frequency by introducing onto the reference path a device making it possible to slightly shift the wavelength of the reference beam. This shift can be carried out by using an acousto-optical cell.

Figure 8:
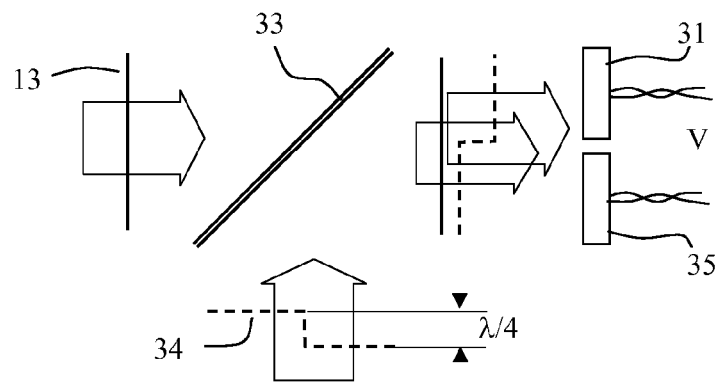
FIG. 8 represents a first embodiment of the optical reception module.

In the absence of acousto-optical shifting, it is also possible to detect the spectrum without folding, having taken care to carry out a synchronous detection in phase and in quadrature as shown in FIG. 8. Two detectors 31 and 35 are then used. The first detector 31 receives a first portion of the reference beam 13 and a first portion of the scattered beam 34. The second detector receives a second portion of the reference beam 13 and a second portion of the scattered beam 34 phase-shifted by a quarter-wavelength relative to the first portion of the scattered beam.

A preferred method of detection is to digitize the signals originating from each of the detectors 31 and 35 and to consider one of the paths as the real component and the other as the imaginary component of a complex signal the Fourier transform of which is computed in order to retrieve the spectral rays.

The diffracted orders can be recombined with the reference beam in various ways.

Figure 9:
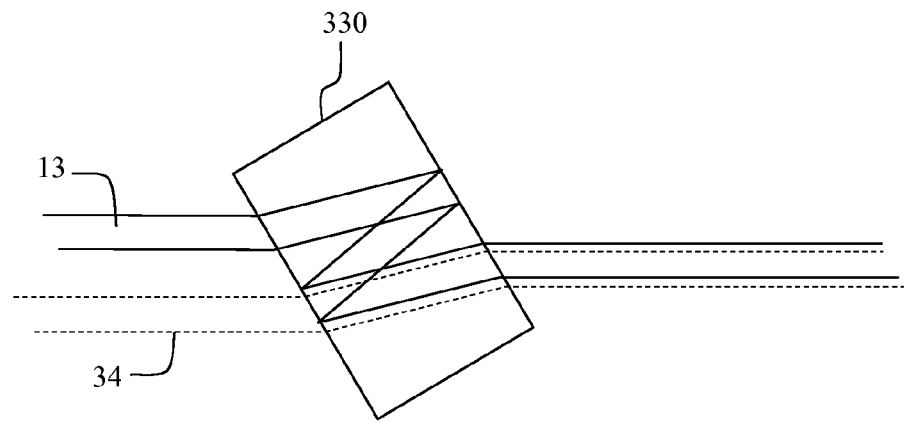
FIG. 9 represents a first embodiment of the optical mixing means.

FIG. 9 represents a first possible mixer 330. It is a strip of glass with flat and parallel faces, inclined on the optical axes of at least the first beam of light 13 and of at least the second beam of light 34, the first beam of light being transmitted by said strip after two successive reflections, the second beam of light being transmitted directly by said strip; the thickness and inclination of the strip being such that the two beams are mixed at the output of the strip 330. This simple mixer also makes it possible to greatly attenuate the reference path by making it sustain two successive reflections, each reflection not reflecting more than a few percent of the incident beam. Specifically, the scattered beams are necessarily of low intensity relative to the intensity of the reference beam. It is therefore worthwhile, in order to balance the energy of the beams, to attenuate the reference path.

Figure 10:
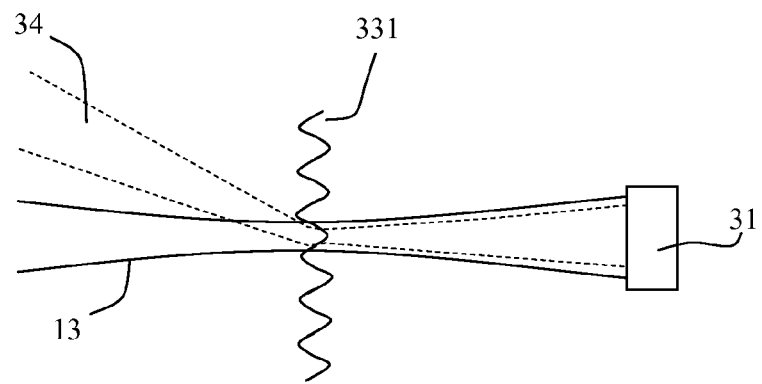
FIG. 10 represents a second embodiment of the optical mixing means.

FIG. 10 represents a second possible mixer 331. It is a grating placed at the image point of the second optical system. Detection can then be carried out on the diffracted orders by this grating. The parameters of the grating are such that the reference beam directly transmitted by the grating and the scattered beam diffracted by the grating combine at the output of the grating.

Figure 11:
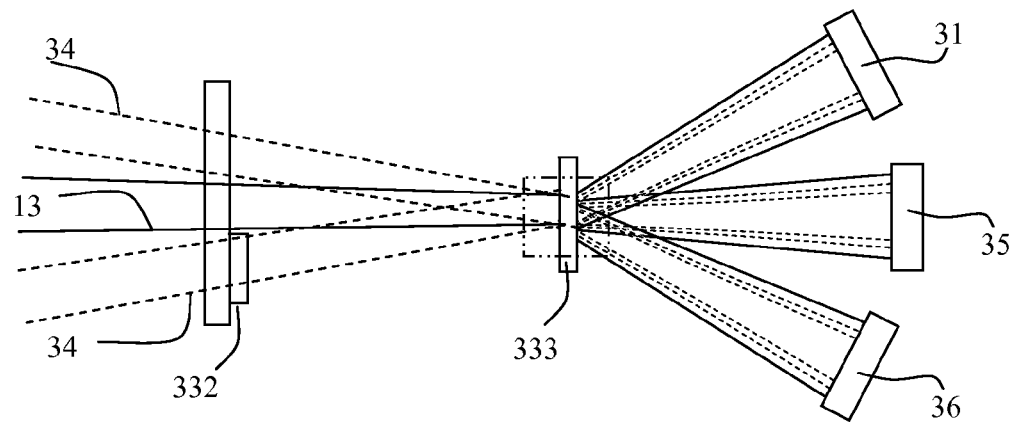
FIG. 11 represents a third embodiment of the optical mixing means.
Figure 12:
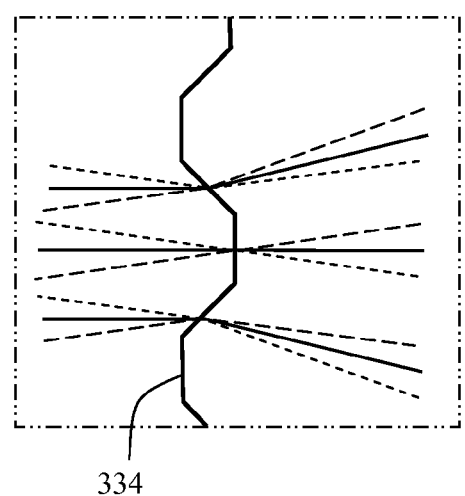
FIG. 12 represents a partial view of FIG. 11.

FIG. 11 represents a third possible mixer mixing the reference beam 13 and two scattered beams 34. A first phase optical strip 332 is placed on the path of the third scattered beam upstream of the optical mixing means. The purpose of this strip is to phase-shift one of the beams 34 by a half-wavelength and the strip is preferably produced by depositing a thin layer on a portion of a medium with parallel faces which passes through the three beams. This device, similar to the phase contrast device devised by Zernicke, makes it possible to convert the phase modulations originating from the intensity-modulation zone. The optical mixing means comprise a second phase strip 333 arranged so as to divert the first reference beam and the second and the third scattered beams in three different directions thus creating three triplets of three beams; each triplet of diverted beams represents the illumination received on bands with a period 'p' and with a width substantially equal to 'p/3' and having a phase shift of 120° relative to the other two. In this case, as shown in FIG. 12, the phase strip 333 comprises a periodic structure comprising identical elements 334, each element comprising at least three flat facets inclined in three different directions. Each of the triplets of beams is sent to a photoreceptor 31, 35 and 36. The signals originating from these three detectors are digitally processed so as to identify the displacement of fringes in each of the directions. The sum of the speeds of displacement provides the speed of sound information while the difference provides the air speed information.

The digital operation leading to this result can be of the following type:
creation of two time sequences S+ and S− on the basis of the signals originating from the detectors 31, 35 and 36:

$$S_+ = s_{31} + s_{35} e^{2i\pi/3} + s_{36} e^{4i\pi/3}$$

$$S_- = s_{31} + s_{35} e^{-2i\pi/3} + s_{36} e^{-4i\pi/3}$$

Fourier transform of these signals
identification of the maxima F+ and F− corresponding to the temporal frequencies of the rising and falling fringes with a pitch 'p' being projected onto the phase strip 333.

The object of the summations on three increasing and decreasing phases is to separate the measurement of the acoustic components being propagated in and against the direction of displacement of the air at the point of measurement. Knowing the sum of the two frequencies F+ and F− therefore makes it possible to identify the speed of sound in the air while their difference makes it possible to identify the speed of air flow.

Figure 13:
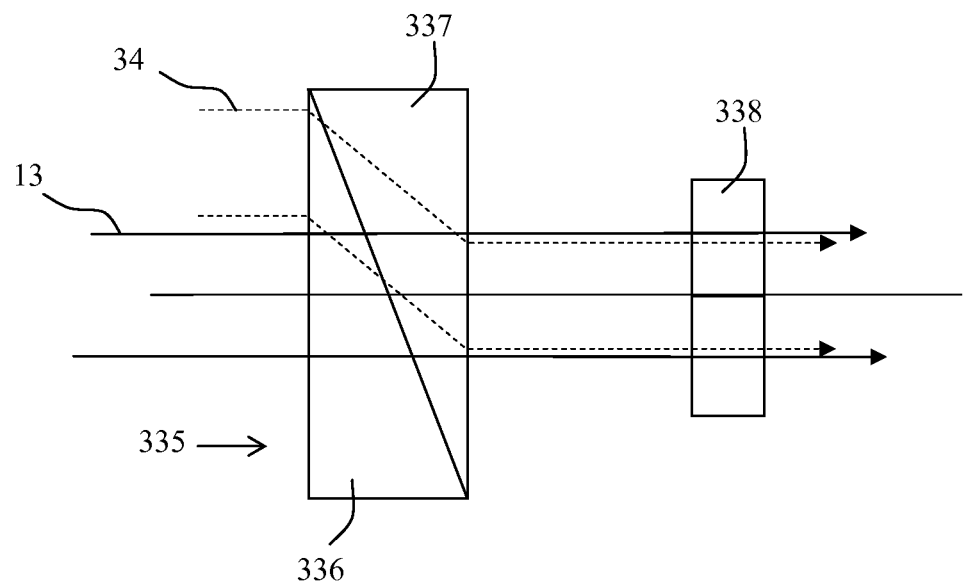
FIGS. 13 and 14 represent a fourth embodiment of the optical mixing means.
Figure 14:
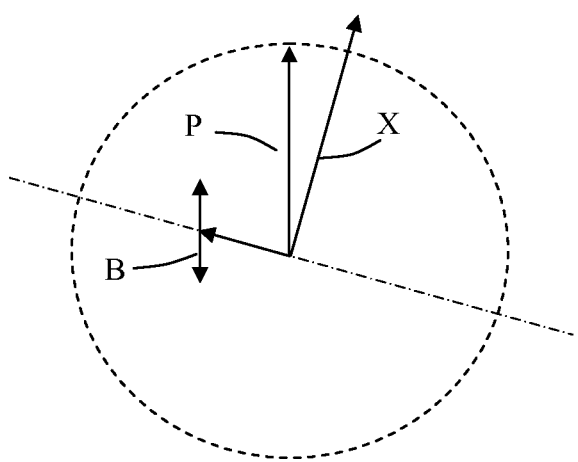

FIG. 13 represents a third possible mixer 335 comprising an interferometer of the Nomarski interferometer type. In this type of interferometer, a birefringent element such as a strip or a crystalline prism is introduced onto the beam so as to create a deflection or a shift equivalent to that provided by the acoustic grating sought. In the case of FIG. 13, the Nomarski interferometer 335 comprises two prisms 336 and 337 mounted head-to-toe in order to form a strip with flat and parallel faces. In this configuration, a polarized light beam exits the Nomarski interferometer parallel to itself but having sustained a shift dependent on its polarization and to the characteristics of the prisms. The axis of polarization of this birefringent element is oriented at a slight angle of incident polarization P so that a small portion of the nondiffracted wave is diverted in the direction of the order of diffraction. Since the order of diffraction is orthogonal to the deflected component of the order zero, a beat can be observed on an analyzer 338 placed at 45° from the axis of the prism X. Preferably, this analysis will be carried out by subtracting the observed beats B at +45° and −45° from the axes of the analyzer as shown in FIG. 14. This interferometer allows the measurement even in the presence of aberrations on the incident or collected beam.

Figure 15:
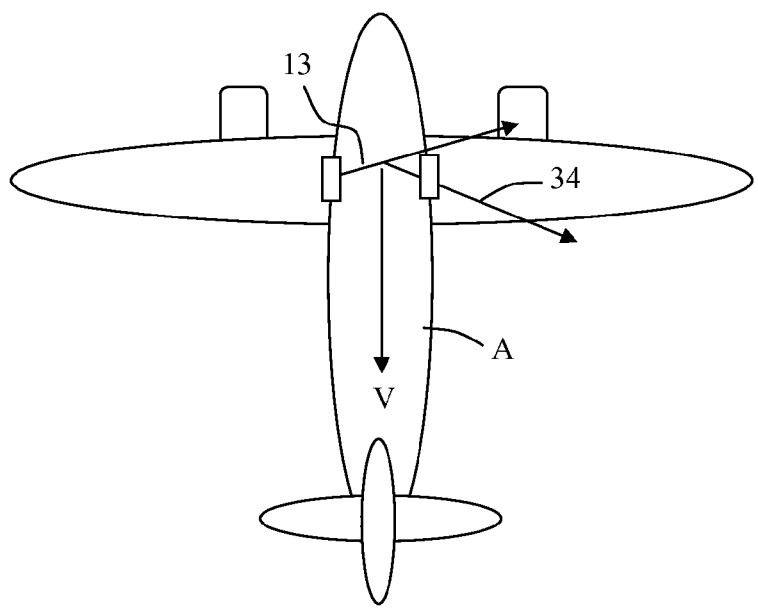
FIG. 15 represents an overview of the installation of the device on an aircraft.

FIG. 15 represents the general principle of installation of the device on an aircraft A. The speed must be measured on the axis perpendicular to the interference fringes associated with the directions of the incident beam 13 and of the detected beam 34. To take a measurement of speed, these directions are placed on an axis virtually perpendicular to the displacement vector V.

There are different configurations making it possible to place the device according to the invention on the aircraft A. The installations adopted depend on the constraints associated with the aerodynamic parameters, on the constraints of space requirement and more generally on the constraints of installation on the aircraft.

Figure 16:
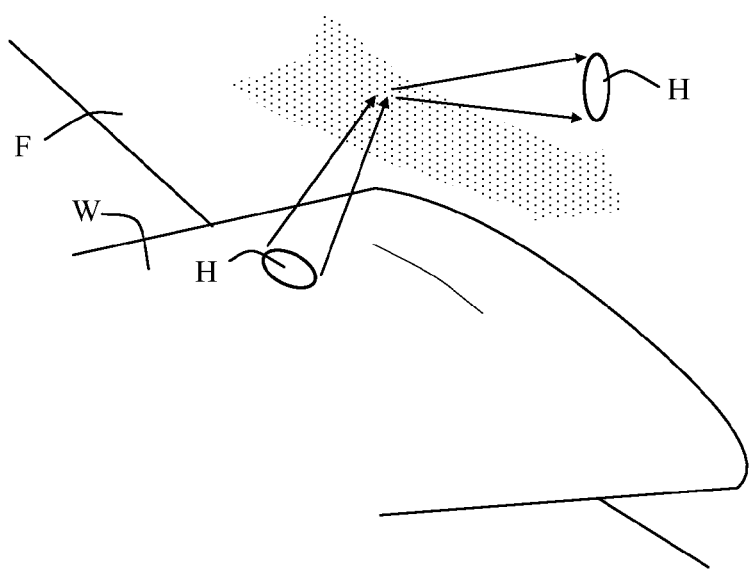
FIGS. 16 to 19 represent various variants of possible installation of the device on an aircraft.
Figure 17:
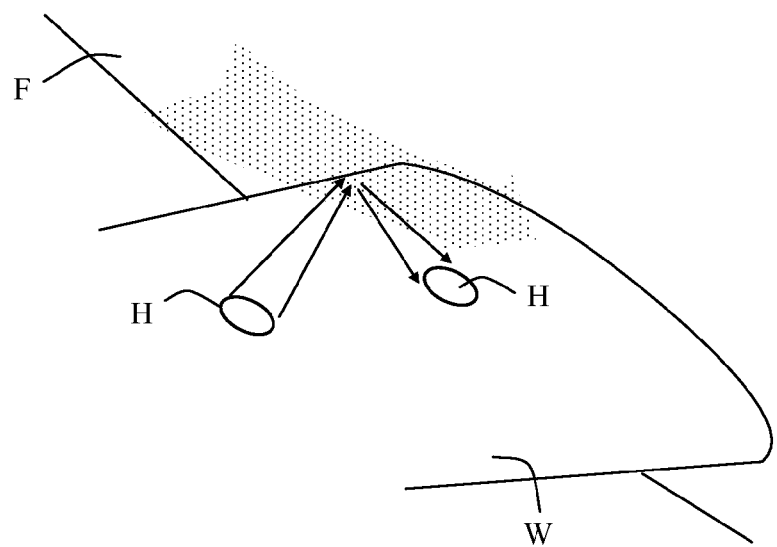
Figure 18:
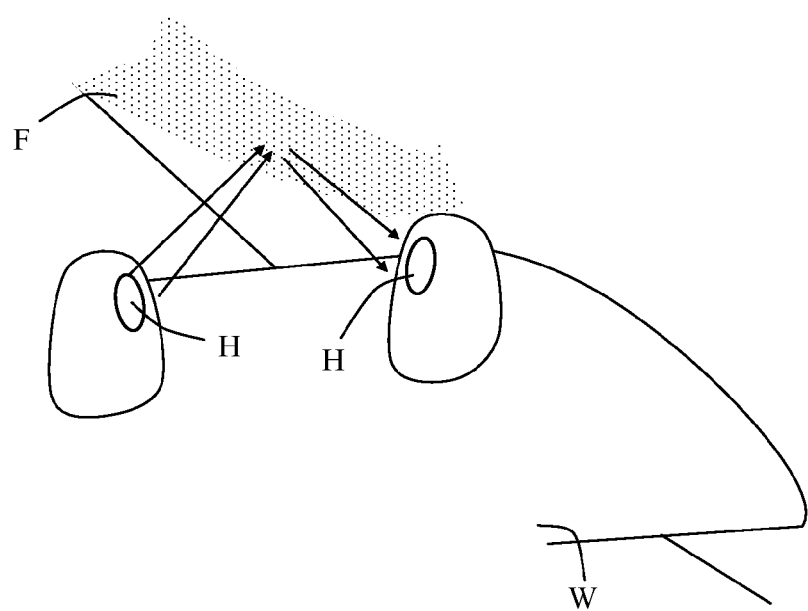
Figure 19:
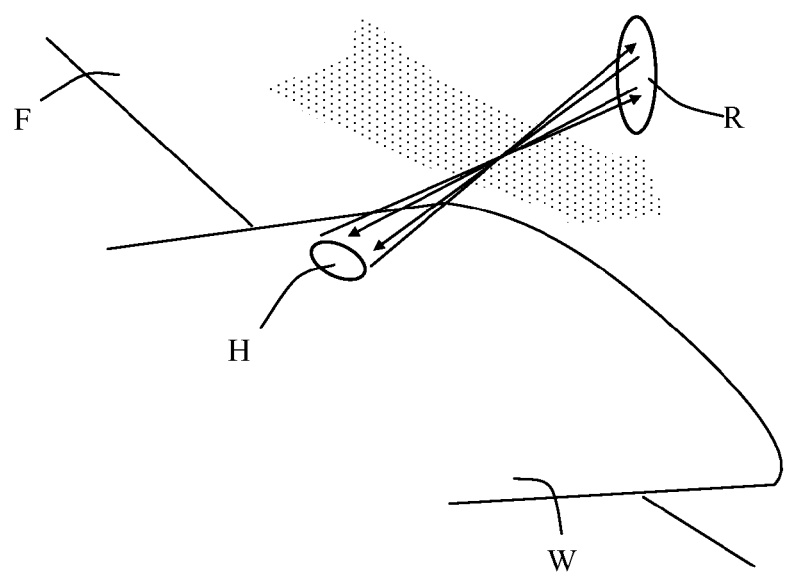

The various possible installations on an aircraft are represented in FIGS. 16 to 19. These figures represent a portion of the fuselage F and of the wing W of an aircraft. In these figures, only the exit windows H of the optical emission and reception systems have been shown by ellipses in the interests of clarity. Naturally, the optical modules are interchangeable: the emission module being able to occupy the location of the reception module. The two optical emission and reception modules may be:

indistinguishable in one and the same base; this is called a monostatic architecture;

integrated in the forms of an insert forming part of the aerodynamic profile as indicated in FIG. 16;

placed approximately face to face in modules coming out of the skin of the airplane as indicated in FIG. 17;

placed in one and the same plane, for example on a wing intrados as indicated in FIG. 18;

placed facing a reflector element R as indicated in FIG. 18; this element may be a reflecting structure: a mirror, a hologram or a reflectorized marker.

The computing means can be installed either in the base of a probe or remotely in central computers.

It is also possible to place a turbulator element in the vicinity of the zone to be analyzed. The turbulence created is partly dissipated in the form of acoustic waves certain of which are found in the band of capture of the optical sensor. The speed of propagation of these waves makes it possible to determine the speed of sound and the speed of flow.

The invention claimed is:

1. An optical device for an aircraft designed to measure temperature associated with molecular movement in a gas, said gas occupying a determined measurement zone, the optical device comprising:

an optical emission module, an optical reception module, optical means forming a reference path and computing means connected to the optical reception module, the optical emission module comprising a first optical system emitting a first light beam at a first wavelength in the determined measurement zone, said first optical system having a first optical axis, the optical reception module comprising a second optical system and at least a first photoreceptor, said second optical system having:

a second optical axis, comprising at least optical mixing means for mixing a portion of the first light beam originating from the reference path and a second light beam corresponding to a portion of the light of the first light beam scattered by the determined measurement zone, said second light beam being emitted at least a second wavelength, forming an image of the first and second mixed light beams on said first photoreceptor, wherein the computing means is arranged to determine at least a difference in wavelength or in frequency between the first wavelength and the second wavelength, the difference in the wavelength or in the frequency being representative of molecular scattering, said molecular scattering being Brillouin-Mandel'shtam scattering, and said difference being linked to a thermal activation of the molecules of the gas, and wherein an angle that the first optical axis and the second optical axis make between them is different from zero.

2. The optical device as claimed in claim 1, wherein the optical means forming the reference path comprise an optical fiber and optical elements arranged to inject into said optical fiber a portion of the first light beam.

3. The optical device as claimed in claim 1, wherein the optical means forming the reference path comprise a device, of the acousto-optical cell type, to slightly shift the wavelength of the reference beam.

4. The optical device as claimed in claim 1, wherein the second optical system comprises at least optical mixing means for mixing a portion of the first light beam originating from the reference path and a third light beam corresponding to a portion of the light of the first light beam scattered by the determined measurement zone, said third light beam being emitted at at least the second wavelength.

5. The optical device as claimed in claim 4, wherein the optical reception module comprises a second photoreceptor, said second optical system forming the image of the first and third mixed light beams on said second photoreceptor.

6. The optical device as claimed in claim 4, wherein an optical phase strip is placed on a path of the third light beam upstream of the optical mixing means.

7. The optical device as claimed in claim 1, wherein the optical mixing means are a strip, with flat and parallel faces, inclined on the optical axes of at least the first light beam and of at least the second light beam, the first light beam being transmitted by said strip after two successive reflections, the second light beam being transmitted directly by said strip.

8. The optical device as claimed in claim 1, wherein the optical mixing means are a diffraction grating, at least one of the first and the second light beams being diffracted by said grating.

9. The optical device as claimed in claim 1, wherein the optical mixing means comprise a Nomarski prism.

10. The optical device as claimed in claim 4, wherein the optical mixing means comprise a phase strip arranged so as to divert the first, the second and the third light beams in three different directions creating three triplets of three beams, each triplet of the diverted beams having a phase shift relative to the other two.

11. The optical device as claimed in claim 10, wherein the phase strip comprises a periodic structure comprising identical elements, each element comprising at least three flat inclined facets.

12. The optical device as claimed in claim 1, wherein the computing means comprise Fourier transform computing means for signals originating from at least the first photoreceptor, means for analyzing said Fourier transforms to determine a frequency peak or peaks, one or more parameters of the molecular movement of the gas being determined based on an analysis of a position or positions of said frequency peak or peaks.

13. The optical device as claimed in claim 12, wherein, the optical reception module comprises two receptors, the computing means perform the Fourier transform on a complex pseudo-signal, a real portion of which is a first signal originating from the first photoreceptor and an imaginary portion of which is a second signal originating from a second photoreceptor.

14. An aircraft, comprising at least one optical device designed to measure the temperature as claimed in claim 1, the determined measurement zone being situated in a vicinity of and outside a boundary layer of the aircraft.

15. The aircraft as claimed in claim 14, wherein the optical device is of the parietal type, with all of the elements of the optical device placed inside the aircraft, and only the first light beam being emitted to the outside of the aircraft.

16. The aircraft as claimed in claim 14, wherein the device also comprises a reflecting optical element placed on a skin of the aircraft and arranged to reflect to a portion of the light of the first beam scattered by the determined measurement zone on the second optical axis of the second optical system to form the second light beam.

17. The aircraft as claimed in claim 14, wherein the aircraft comprises a mechanical element arranged so as to create acoustic turbulence in the vicinity of the determined measurement zone.

18. The optical device as claimed in claim 1, wherein the computing means are designed to measure a speed of the molecular movement in the gas.

\* \* \* \* \*